(12) United States Patent
Arora (10) Patent No.: US 11,093,924 B2
(45) Date of Patent: Aug. 17, 2021

(54) METHOD AND SYSTEM FOR VERIFICATION OF DEVICE AUTHENTICITY

(71) Applicant: Mastercard International Incorporated, Purchase, NY (US)

(72) Inventor: Ankur Arora, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 315 days.

(21) Appl. No.: 15/664,302

(22) Filed: Jul. 31, 2017

(65) Prior Publication Data

US 2019/0034903 A1   Jan. 31, 2019

(51) Int. Cl.
  *G06Q 20/20*  (2012.01)
  *G07G 3/00*  (2006.01)
  (Continued)

(52) U.S. Cl.
  CPC ........... *G06Q 20/206* (2013.01); *G06Q 20/02* (2013.01); *G06Q 20/20* (2013.01);
  (Continued)

(58) Field of Classification Search
  CPC .............................. G06Q 20/206; G07G 3/006
  See application file for complete search history.

(56) References Cited

U.S. PATENT DOCUMENTS 10,366,250 B1 *   7/2019   Chen ...................... G06F 21/33
2015/0073981 A1   3/2015   Adjaoute
(Continued)

FOREIGN PATENT DOCUMENTS

| CN | 103049851 A | 4/2013 |
|---|---|---|
| CN | 103312519 A | 9/2013 |
| WO | 2007/002702 A2 | 1/2007 |

OTHER PUBLICATIONS

Matthäus Wander, https://commons.wikimedia.org/wiki/File:Bitcoin_Block_Data.svg, Jun. 22, 2013 (Year: 2013).*

(Continued)

*Primary Examiner* — A. Hunter Wilder
*Assistant Examiner* — Joseph M Mutschler
(74) *Attorney, Agent, or Firm* — Buchanan Ingersoll & Rooney PC (57) ABSTRACT

A method for determining authenticity of a point of sale device includes: storing a blockchain and point of sale identifier pair, wherein the blockchain is comprised of a plurality of blocks, each comprised of a block header and transaction data values, each transaction data value corresponding to a payment transaction involving a point of sale device associated with the point of sale identifier and includes an indication of approval or denial for the payment transaction; receiving a fraud probability request, the request including the point of sale identifier; identifying a number of transaction data values that include an indication of denial; determine an authenticity value indicating a likelihood that the point of sale device is engaged in fraudulent activity based on a registered latitude and longitude of the point of sale device, the number of transaction data values, and additional criteria; and transmitting the determined authenticity value.

20 Claims, 5 Drawing Sheets

(51) Int. Cl.
    *G06Q 20/02*     (2012.01)
    *G06Q 20/40*     (2012.01)

(52) U.S. Cl.
    CPC ......... *G06Q 20/4016* (2013.01); *G07G 3/006* (2013.01); *G06Q 2220/00* (2013.01)

(56) References Cited

U.S. PATENT DOCUMENTS

| | | | |
|---|---|---|---|
| 2015/0227936 A1* | 8/2015 | Bruesewitz | G06Q 20/382 705/44 |
| 2017/0132635 A1* | 5/2017 | Caldera | G06Q 20/4016 |
| 2018/0096329 A1* | 4/2018 | Hamilton | G06Q 20/204 |
| 2018/0144156 A1* | 5/2018 | Marin | G06F 21/6272 |

OTHER PUBLICATIONS

Notification of Transmittal of the International Search Report and the Written Opinion of the International Searching Authority (Forms PCT/ISA/220, PCT/ISA/210 and PCT/ISA/237) dated Aug. 21, 2018, by the European Patent Office in corresponding International Application No. PCT/US2018/035323. (12 pages).

Office Action dated Jun. 15, 2021, by the China National Intellectual Property Administration in corresponding Chinese Patent Application No. 201810780298.0 (7 pages) (waiting for the English Translation).

* cited by examiner

METHOD AND SYSTEM FOR VERIFICATION OF DEVICE AUTHENTICITY

FIELD

The present disclosure relates to the verification of the authenticity of a device, specifically the verification of authenticity of a point of sale device based via a blockchain to prevent the use of spoofed point of sale devices to reduce the likelihood of fraud.

BACKGROUND

Physical point of sale devices provide consumers with a convenient location to conduct a payment transaction using a transaction account. Merchants often provide point of sale devices that are capable of reading debit cards, credit cards, or other payment instruments associated with a transaction account, to enable the consumer to fund a transaction with the transaction account rather than cash. Similarly, automated teller machines are point of sale devices that can provide a consumer with convenient access to their transaction account without the need to visit a physical branch of their issuing bank, which can be additionally convenient after normal banking hours or in remote locations.

Due to the frequent usage of such devices, fraudsters and other nefarious actors have begun to compromise point of sale devices in an effort to illegally and fraudulently capture transaction account details to gain unauthorized access to a transaction account. One such method includes the use of a spoofed point of sale device, which is an unauthorized copy of a point of sale device that may be used by the fraudster to capture the transaction account details when reading a consumer's payment instrument. Another method includes the replacing of a card reader of a legitimate point of sale device with a card reader designed to capture the transaction account details for use by a fraudster. In some instances, fraudsters have resorted to designing elaborate physical implementations of such devices in an effort to trick and confuse consumers.

As a result, many consumers may use fraudulent or compromised point of sale devices without being aware. Currently, there are no methods available to a consumer to be apprised of the authenticity of a point of sale device prior to entering a payment transaction. At this point in time, the only opportunity for an individual to authenticate a point of sale device is to physically inspect the device to look for anything suspicious, such as a removable card reader. Unfortunately, many consumers are not informed as to what to look for when identifying a compromised point of sale device. Furthermore, many fraud techniques may compromise a point of sale device without physically altering the device, such as a completely spoofed point of sale device. Thus, there is a need for a technical solution to assist consumers in evaluating the authenticity of a physical point of sale device prior to entering into a payment transaction.

SUMMARY

The present disclosure provides a description of systems and methods for determining the authenticity of a point of sale device. The consumer submits a request for authentication to a remote server, where the request identifies a point of sale device that the consumer wants to authenticate, such as obtained by reading a machine-readable code displayed on the physical point of sale device. The remote server then identifies data related to the point of sale device as stored in a blockchain, which can provide immutability and prevent tampering of the data, to further increase security against fraudsters. The remote server determines an authenticity value that indicates the likelihood that the point of sale device is engaged in fraudulent activity based on the consumer's request and available data, which is then made available to the consumer. The consumer can then evaluate if they trust the point of sale device enough to proceed with their transaction, or to refuse, and potentially utilize an alternative form of payment, to protect their transaction account.

A method for determining authenticity of a point of sale device includes: storing, in a memory of a processing server, a blockchain and point of sale identifier pair, wherein the blockchain is comprised of a plurality of blocks, each block being comprised of at least a block header and one or more transaction data values, and where each transaction data value corresponds to a payment transaction involving a point of sale device corresponding to the point of sale identifier and includes at least an indication of approval or denial for the corresponding payment transaction; receiving, by a receiving device of the processing server, a fraud probability request from a computing device, wherein the fraud probability request includes at least the point of sale identifier; executing, by a querying module of the processing server, a query on the blockchain to identify a number of transaction data values stored in the plurality of blocks comprising the blockchain that include an indication of denial; determine, by a determination module of the processing server, an authenticity value indicating a likelihood that the point of sale device is engaged in fraudulent activity based on at least a registered latitude and longitude of the point of sale device, the identified number of transaction data values stored in the plurality of blocks comprising the blockchain that include an indication of denial, and one or more additional criteria; and electronically transmitting, by a transmitting device of the processing server, at least the determined authenticity value to the computing device.

A system for determining authenticity of a point of sale device includes: a memory of a processing server configured to store a blockchain and point of sale identifier pair, wherein the blockchain is comprised of a plurality of blocks, each block being comprised of at least a block header and one or more transaction data values, and where each transaction data value corresponds to a payment transaction involving a point of sale device corresponding to the point of sale identifier and includes at least an indication of approval or denial for the corresponding payment transaction; a receiving device of the processing server configured to receive a fraud probability request from a computing device, wherein the fraud probability request includes at least the point of sale identifier; a querying module of the processing server configured to execute a query on the blockchain to identify a number of transaction data values stored in the plurality of blocks comprising the blockchain that include an indication of denial; a determination module of the processing server configured to determine an authenticity value indicating a likelihood that the point of sale device is engaged in fraudulent activity based on at least a registered latitude and longitude of the point of sale device, the identified number of transaction data values stored in the plurality of blocks comprising the blockchain that include an indication of denial, and one or more additional criteria; and a transmitting device of the processing server configured to electronically transmit at least the determined authenticity value to the computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Determining Authenticity of a Point of Sale Device

Figure 1:
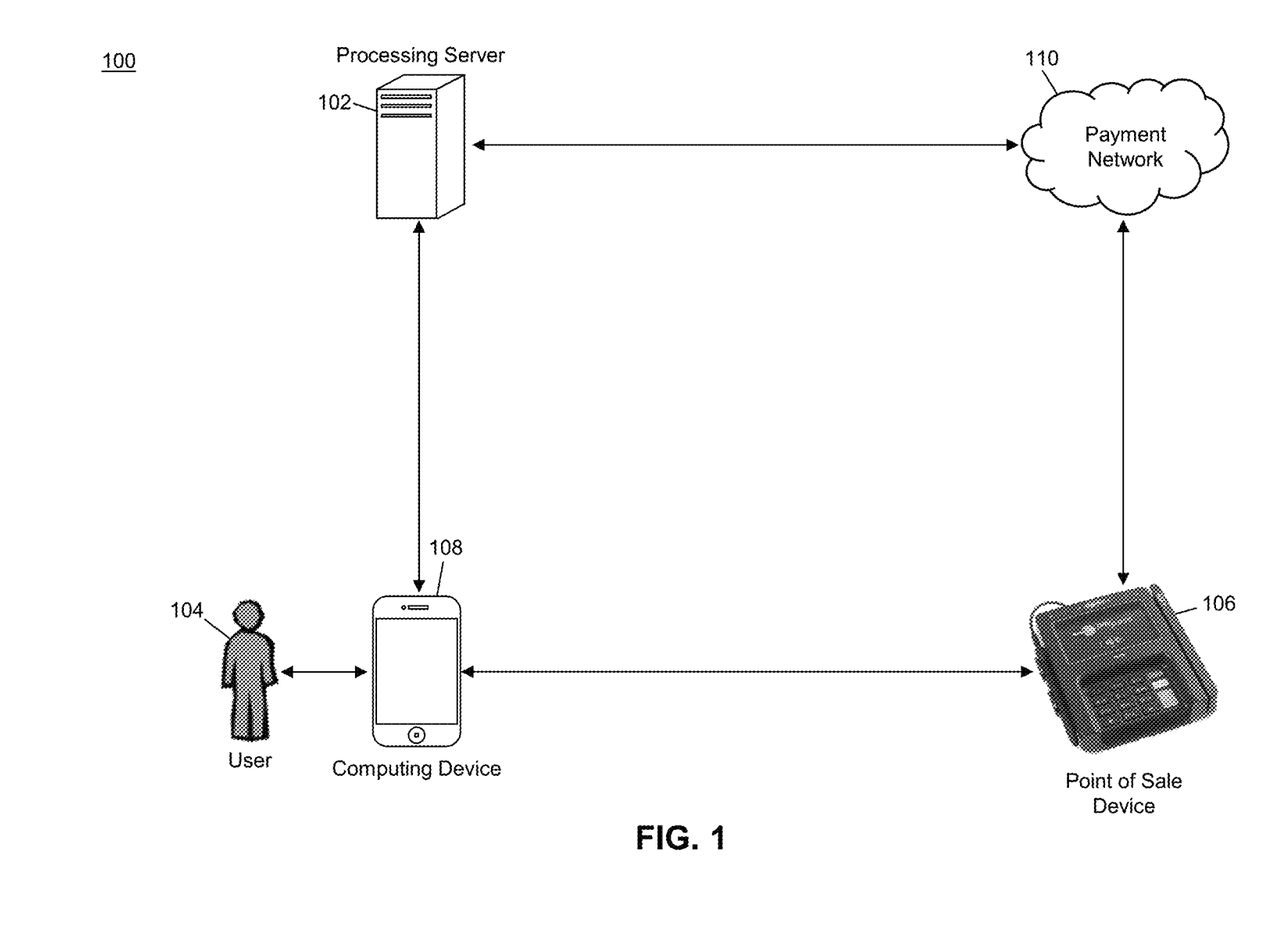
FIG. 1 is a block diagram illustrating a high level system architecture for determining authenticity of a point of sale device in accordance with exemplary embodiments.

FIG. 1 illustrates a system 100 for determining the authenticity of a point of sale device using a blockchain based on a consumer request, which may utilize past transaction history of the point of sale device, geographic location, and other criteria and the immutability of a blockchain to ensure an accurate determination of authenticity.

The system 100 may include a processing server 102. The processing server 102, discussed in more detail below, may be configured to determine the authenticity of a point of sale device 106 using data stored in a blockchain and additional criteria. In the system 100, a user 104 may approach a point of sale device 106 with a desire to initiate a payment transaction at the point of sale device 106. The point of sale device 106 may be located at a merchant with whom the user 104 wants to transact, may be an automated teller machine that the user 104 wants to use to perform functions associated with their transaction account, may be a self-service point of sale device 106, such as a vending machine, or any other type of point of sale device 106 that may be configured to capture account details of a transaction account for use in funding a payment transaction.

The user 104 may possess a computing device 108, which may be used to obtain a point of sale identifier associated with the point of sale device 106. The computing device 108 may be any type of computing device suitable for performing the functions discussed herein, such as a desktop computer, laptop computer, notebook computer, tablet computer, cellular phone, smart phone, smart watch, smart television, wearable computing device, implantable computing device, etc. In some embodiments, the user 104 may enter the point of sale identifier into the computing device 108 using one or more input devices thereof. In other embodiments, the computing device 108 may obtain the point of sale identifier directly from the point of sale device 106. For instance, in one example, the point of sale identifier may be displayed on the point of sale device 106 and entered into the computing device 108 or read by an optical imager (e.g., a camera) of the point of sale device 106. In another example, the point of sale identifier may be encoded in a machine-readable code (e.g., a bar code, quick response code, etc.) displayed on the point of sale device 106, either physically or via a display device of the point of sale device 106. In yet another example, the point of sale device 106 may electronically transmit the point of sale identifier to the computing device 108, such as via near field communication, radio frequency, Bluetooth, or other suitable communication method.

The point of sale identifier may be a unique value associated with a specific point of sale device 106. In some cases, each point of sale device 106 may be a physical point of sale device 106. The point of sale identifier may be any suitable value that may be unique to a single device and used for performing the functions discussed herein, such as a registration number, serial number, identification number, media access control address, Internet protocol address, telephone number, etc.

After the computing device 108 obtains the point of sale identifier, the user 104 may, via the computing device 108, submit a fraud probability request to the processing server 102. The request may be submitted via any suitable communication method, such as the Internet, a cellular communication network, etc., and may be submitted to the processing server 102 via any suitable method. For instance, in one example, the user 104 may visit a web page where the point of sale identifier may be entered into a form and submitted, which may route the point of sale identifier and any other data to the processing server 102. In another example, an application program may be executed by the computing device 108 that may be configured to receive the point of sale identifier and any other data as input and then submit such data to the processing server 102. In some embodiments, the computing device 108 may also submit additional data to the processing server 102, such as a geographic location of the computing device 108 (e.g., identified using traditional methods, such as the global positioning system, cellular network triangulation, local area network identification, etc.), data requested from the processing server 102, etc.

The processing server 102 may receive the fraud probability request from the computing device 108 and identify the data included therein. The processing server 102 may then identify data stored in a blockchain that is associated with the point of sale device 106 corresponding to the point of sale identifier. The blockchain may be an immutable, decentralized ledger comprised of a plurality of blocks, where each block is comprised of at least a block header and one or more transaction data values. The block header may include at least a timestamp, a block reference values, and a transaction reference value. The block reference value may be a reference to the block most recently added to the blockchain prior to the respective block. The transaction reference value may be a reference to the one or more transaction data values included in the respective block. The reference values may be generated via hashing the corresponding data. For instance, the block reference value may be generated via the application of one or more hashing algorithms to the block header of the prior block. The use of reference values may ensure the immutability of the blockchain, as a single transaction data value may not be modified without necessitating modification of that block header's transaction reference value, which would require modification to the block reference value in the subsequent block, and every subsequent block remaining in the blockchain. As the blockchain is decentralized and stored across a plurality of nodes comprising a blockchain network, such modifications would have to be performed across every node simultaneously, which is typically impossible due to physical network constraints. As such, the blockchain provides for an immutable record of transaction data values.

Each transaction data value stored in the blockchain may correspond to a payment transaction involving a point of sale device 106. For instance, when the point of sale device 106 engages in a payment transaction, the payment transaction may be processed by a payment network 110. The payment network 110 may provide transaction data values, or transaction data for inclusion in a transaction data value, to a node in the blockchain network, which may generate and validate a new block using traditional methods. In one embodiment, the blockchain may be comprised entirely of transaction data values involving the point of sale device 106 whose authenticity is being determined. In such embodiments, the processing server 102 may have the blockchain and point of sale identifier associated as a pair. In other embodiments, the blockchain may be comprised of transaction data values associated with a plurality of different point of sale devices 106, wherein each transaction data value may include the point of sale identifier associated with the respective point of sale device 106. Each transaction data value may include at least an indication as to whether the corresponding payment transaction was approved or denied. In some cases, an indication of denial may be accompanied by a reason code indicating the reason for denial.

The processing server 102 may obtain the blockchain using any suitable method. For instance, in one example, the blockchain data may be posted to a web site and retrieved by the processing server 102 accordingly. In another example, the processing server 102 may request the blockchain from a node comprising the blockchain network. In yet another example, the processing server 102 itself may be a node in the blockchain network, and may obtain the blockchain data through standard operation as a node.

The processing server 102 may, after receiving the fraud probability request, identify the transaction data values stored in the blockchain that correspond to payment transactions involving the point of sale device 106 associated with the submitted point of sale identifier. The processing server 102 may then determine an authenticity value, where the authenticity value indicates a likelihood that the point of sale device 106 is engaged in fraudulent activity. The authenticity value may be based on a plurality of different factors, including, at least, a number of identified transaction data values that indicate a denied transaction (e.g., and also include a reason code indicating a denial for fraud, if applicable), a latitude and longitude registered to the point of sale device 106, and one or more additional criteria. In one embodiment, the latitude and longitude registered to the point of sale device 106 may be stored in the blockchain as a transaction data value. In another embodiment, the processing server 102 may utilize a look-up table that stores latitudes and longitudes registered to various point of sale identifiers.

The one or more additional criteria may be further criteria used by the processing server 102 in determining the authenticity value. Such criteria may include, for example: the geographic location of the computing device 108 (e.g., and its proximity to the registered latitude and longitude for the point of sale device 108), the value (e.g., transaction amounts) of the transaction data values including an indication of denial, the value of fraudulent transactions in a geographic area that includes the registered latitude and longitude, the number of fraudulent transactions in the geographic area, a likelihood of fraud associated with that geographic area, the geographic locations of recent (e.g., based on block timestamps or data included in the respective data values) transaction data values as compared to the registered latitude and longitude, etc. For instance, if the registered latitude and longitude of the point of sale device 106 is significantly far away from the computing device 108, there may be a high likelihood that the point of sale device 106 is a spoof point of sale device (e.g., of the real point of sale device located at the registered latitude and longitude), and thus indicate a high likelihood of fraud. In another example, if the registered latitude and longitude and computing device 108 geographic location are in a geographic area where fraud is frequent, and if recent transactions involving the point of sale device 106 have been declined or reversed, it may indicate a high likelihood that the point of sale device 106 was compromised. In some embodiments, the processing server 102 may be configured to request additional criteria from one or more third party entities, such as financial institutions, payment processors, fraud prevention institutions, etc.

Once the authenticity value has been determined, the processing server 102 may electronically transmit the authenticity value to the computing device 108. In some cases, the processing server 102 may deliver the authenticity value using the same method via which the fraud probability request was submitted. The computing device 108 may then display the authenticity value to the user 104. The user 104 may view the authenticity value and use it to guide their decision whether or not to engage in a payment transaction with the point of sale device 106. In some embodiments, the processing server 102 may provide additional data to the user 104 to assist in their decision making. For instance, the processing server 102 may include the registered latitude and longitude of the point of sale device 106, a frequency (e.g., percentage, rate, etc.) of declined and/or fraudulent transactions involving the identified point of sale device 106, or data associated with the most recent transaction (e.g., overall or fraudulent/declined), such as its time, value, disposition, etc.

The methods and systems discussed herein may thus assist in guiding users 104 when conducting payment transactions at point of sale devices 106 by providing accurate assessments of the authenticity of a point of sale device 106. The use of a blockchain to store relevant data may ensure that the data itself cannot be compromised, further increasing the effectiveness of the processing server 102 in assisting the user 104. In addition, the determination of authenticity by the processing server 102 can provide for beneficial data being provided to users 104 without modification to existing point of sale devices 106

Processing Server

Figure 2:
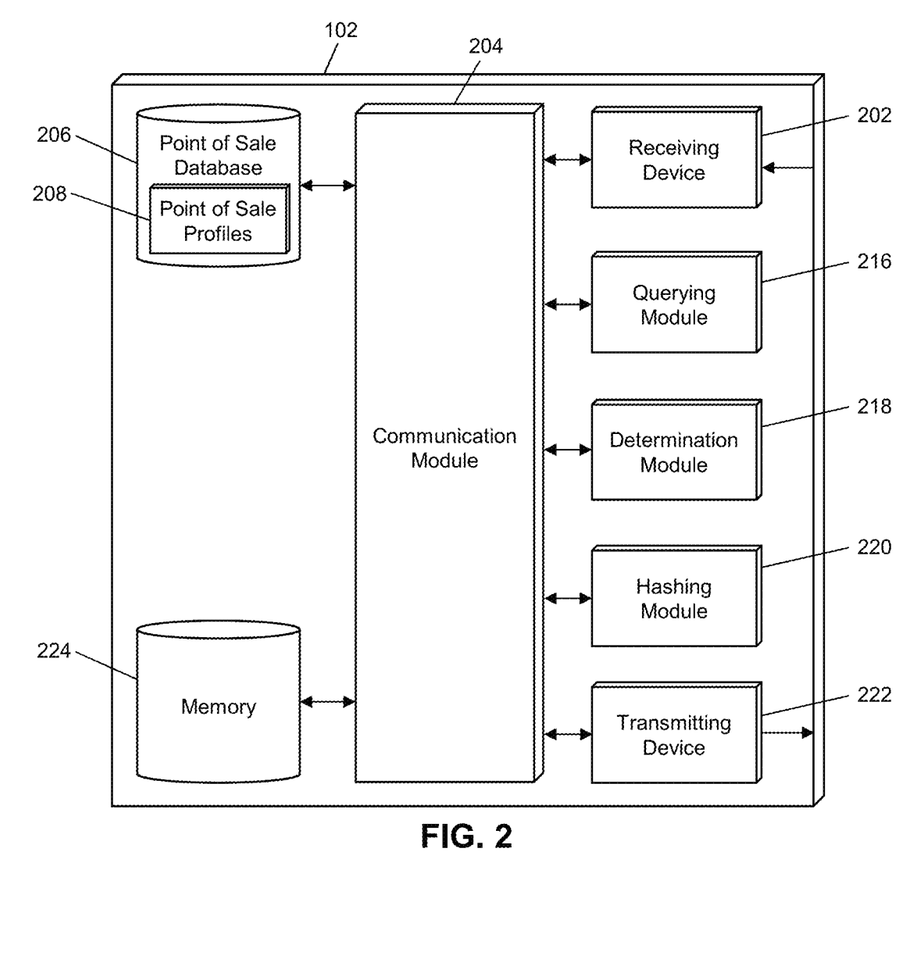
FIG. 2 is a block diagram illustrating the processing server of the system of FIG. 1 for determining authenticity of a point of sale device in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from computing devices 108, payment networks 110, blockchain nodes, and other systems and entities via one or more communication methods, such as near field communication, physical contact points, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 108, which may be superimposed or otherwise encoded with fraud probability requests, which may include at least a point of sale identifier and may further include a geographic location, requested data, or other data as discussed herein. In embodiments where the processing server 102 may be a blockchain node, the receiving device 202 may also be configured to receive data signals electronically transmitted by the payment network 110, such as may be superimposed or otherwise encoded with transaction data. In such embodiments, the receiving device 202 may also receive new blocks from other blockchain nodes for verification. In other embodiments, the receiving device 202 may be configured to receive blockchain data, such as upon request of blockchain nodes or via web requests for blockchain data.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, determination module 218, hashing module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the processing server 102 may include a point of sale database 206. The point of sale database 206 may be configured to store a plurality of point of sale profiles 208 using a suitable data storage format and schema. The point of sale database 206 may be a relational database that utilizes structured query language for the storage, identification, modifying, updating, accessing, etc. of structured data sets stored therein. Each point of sale profile 208 may be a structured data set configured to store data related to a point of sale device 106. Each point of sale profile 208 may include, for instance, the point of sale identifier associated with the respective point of sale device 106 and the registered latitude and longitude of the point of sale device 106.

The processing server 102 may include a querying module 216. The querying module 216 may be configured to execute queries on databases to identify information. The querying module 216 may receive one or more data values or query strings, and may execute a query string based thereon on an indicated database, such as the point of sale database 206, to identify information stored therein. The querying module 216 may then output the identified information to an appropriate engine or module of the processing server 102 as necessary. The querying module 216 may, for example, execute a query on the point of sale database 206 to identify a point of sale profile 208 that includes a point of sale identifier received in a fraud probability request, such as to identify the registered latitude and longitude stored therein. The querying module 216 may also be configured to execute queries on a blockchain to identify transaction data values stored therein.

The processing server 102 may also include a determination module 218. The determination module 218 may be configured to make determinations as part of the functions performed by the processing server 102 as discussed herein. The determination module 218 may receive an instruction as input, may make a determination based on the instruction, and may output a result of the determination to another module or engine of the processing server 102. In some instances, data for use in the determination may be included in the input. In other instances, the determination module 218 may be configured to obtain such data as needed to perform a determination. The determination module 218, may, for example, be configured to determine authenticity values for a point of sale device 106 based on transaction data values, the registered latitude and longitude of the point of sale device 106, and additional criteria as discussed herein.

In some embodiments, such as in instances where the processing server 102 may be a blockchain node, the processing server 102 may also include a hashing module 220. The hashing module 220 may be configured to apply hashing algorithms to data to obtain hash values. The hashing module 220 may receive data to be hashed, may generate a hash value from the data, and may output the hash value to another module or engine of the processing server 102. The hashing module 220 may, for example, be configured to generate block reference values for block headers via hashing of a block header of the most recent (e.g., based on timestamp) block added to the blockchain, and to generate transaction reference values via hashing transaction data values being included in the respective block.

The processing server 102 may also include a transmitting device 222. The transmitting device 222 may be configured to transmit data over one or more networks via one or more network protocols. In some instances, the transmitting device 222 may be configured to transmit data to computing devices 108, payment networks 110, blockchain nodes, and other entities via one or more communication methods, such as near field communication, physical contact points, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to computing devices 108, which may be superimposed or otherwise encoded with authenticity values and any other data requested by the computing device 108 for use by the user 104 in authenticating the point of sale device 106, such as the registered latitude and longitude of the point of sale device 106, recent transactions involving the point of sale device 106, fraud statistics for the geographic area, the number of fraudulent transactions involving the point of sale device 106, etc. The transmitting device 222 may be configured to electronically transmit data signals that are superimposed or otherwise encoded with data requests, such as may be transmitted to the payment network 110 to request transaction data for transaction data values, to blockchain nodes to request updated blockchain data, etc.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, blockchain data, geographic area data, fraud frequencies based on geographic location, etc.

Process for Determining Authenticity of a Point of Sale Device

Figure 3:
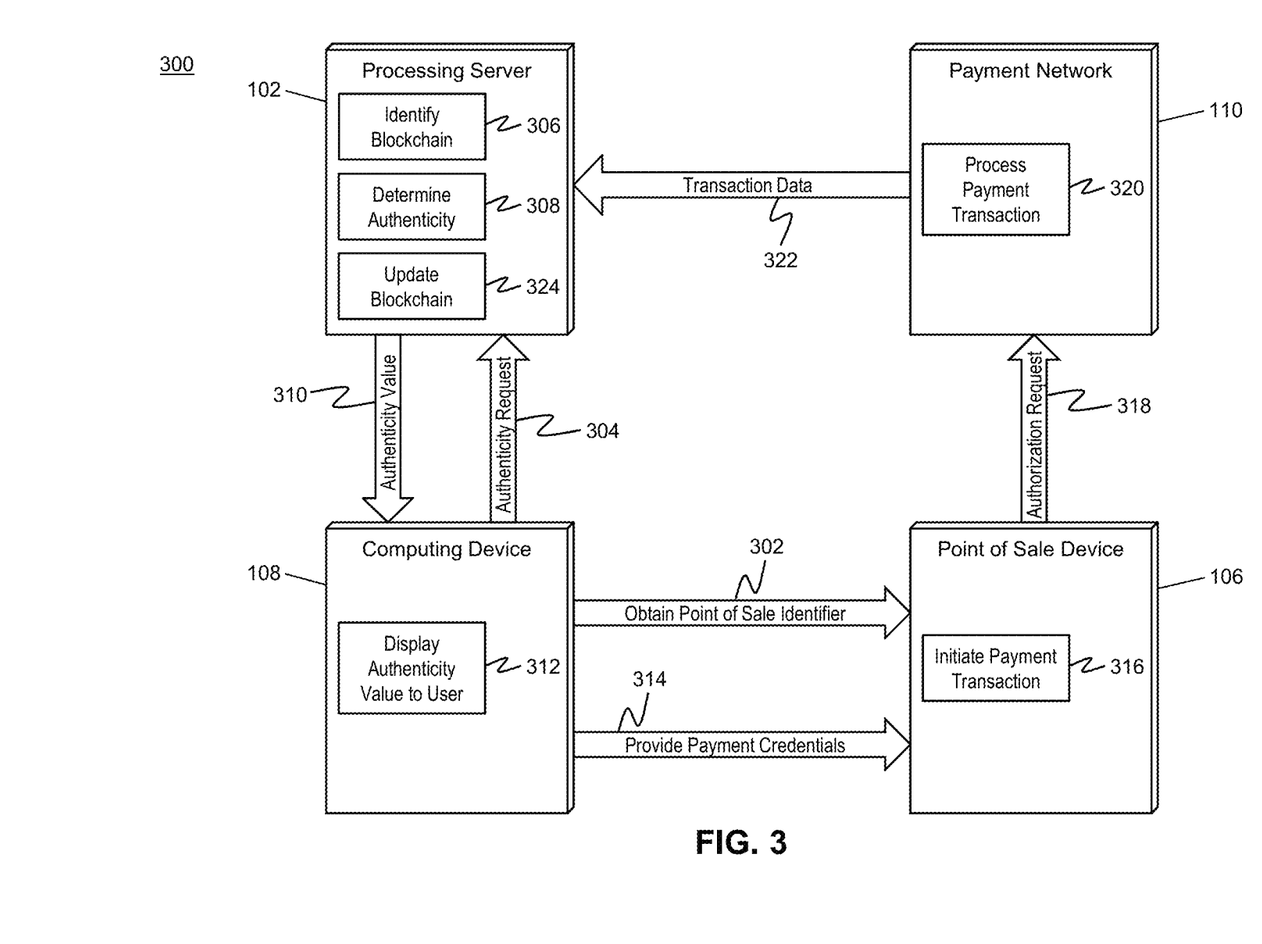
FIG. 3 is a flow diagram illustrating a process for determining authenticity of a point of sale device using the system of FIG. 1 in accordance with exemplary embodiments.

FIG. 3 illustrates a process 300 for determining the authenticity of a point of sale device 106 in the system 100 that utilizes a blockchain and a point of sale identifier read from the point of sale device 106.

In step 302, the computing device 108 may obtain the point of sale identifier from the point of sale device 106. In one embodiment, this may include the reading of a machine-readable code displayed on the point of sale device 106 that is encoded with the point of sale identifier. In another embodiment, it may include the receiving of the point of sale identifier via electronic transmission from the point of sale device 106 using a suitable communication method, such as near field communication. In step 304, the computing device 108 may electronically transmit an authenticity request (e.g., a fraud probability request) to the processing server 102 using a suitable communication method, for receipt by the receiving device 202 thereof. The authenticity request may include at least the point of sale identifier, but may further include a geographic location of the computing device 108 and data requested by the user 104.

In step 306, the querying module 216 of the processing server 102 may identify blockchain data associated with the point of sale device 106. More specifically, the querying module 216 may identify transaction data values stored in the blockchain that include or are otherwise associated with the point of sale identifier included in the authenticity request. In step 308, the determination module 218 of the processing server 102 may determine an authenticity value for the point of sale device 106 based on at least a number of the identified transaction data values, a latitude and longitude registered to the point of sale device 106 (e.g., identified in the blockchain or in a point of sale profile 208 in the point of sale database 206 of the processing server 102), and one or more additional criteria, such as the geographic location of the computing device 108, geographic area comprising the registered latitude and longitude, etc.

In step 310, the transmitting device 222 of the processing server 102 may electronically transmit the determined authenticity value to the computing device 108 using a suitable communication method. In instances where the authenticity request indicated that additional data was requested, the authenticity value may be accompanied by such additional data, such as the registered latitude and longitude for the point of sale identifier, the last transaction involving the point of sale device 106, etc. In step 312, the computing device 108 may display the authenticity value and any other additional to the user 104, who may use the data to decide whether or not to conduct a payment transaction via the point of sale device 106.

If the user 104 decides to move forward with the transaction, then, in step 314, the user 104 may provide payment credentials for a transaction account to be used to fund the transaction to the point of sale device 106, such as by inserting a payment card into a card reader, transmitting the payment credentials via near field communication, or other method for conveying payment credentials that will be apparent to persons having skill in the relevant art. In step 316, the point of sale device 106 may initiate the payment transaction, such as by generating an authorization request that includes the payment credentials and other transaction data (e.g., transaction amount, transaction time, transaction date, issuer data, acquirer data, product data, offer data, reward data, loyalty data, currency type, etc.). The authorization request may be a specially formatted transaction message, such as may be formatted pursuant to one or more standards governing the exchange of financial transaction messages, such as the International Organization of Standardization's ISO 8583 or ISO 20022 standards.

In step 318, the authorization request for the payment transaction may be submitted to the payment network 110 via payment rails associated therewith, and may be submitted directly by the point of sale device 106 or through one or more intermediate entities, such as an acquiring financial institution or a gateway processor. In step 320, the payment network 110 may process the payment transaction using traditional methods and systems. In step 322, transaction data for the payment transaction may be submitted to the processing server 102, for receipt by the receiving device 202 thereof. In instances where the processing server 102 may not be a blockchain node, the transaction data may comprise a transaction data value included in a block added to the blockchain, which may be received by the processing server 102 in step 322. In cases where the processing server 102 may be a blockchain node, the process 300 may also include step 324, where the processing server 102 may generate a new block that includes the transaction data as a transaction data value, which may be added to the blockchain as discussed herein. The transaction data for the new transaction may then be utilized in future determinations of authenticity of the point of sale device 106.

Exemplary Method for Determining Authenticity of a Point of Sale Device

Figure 4:
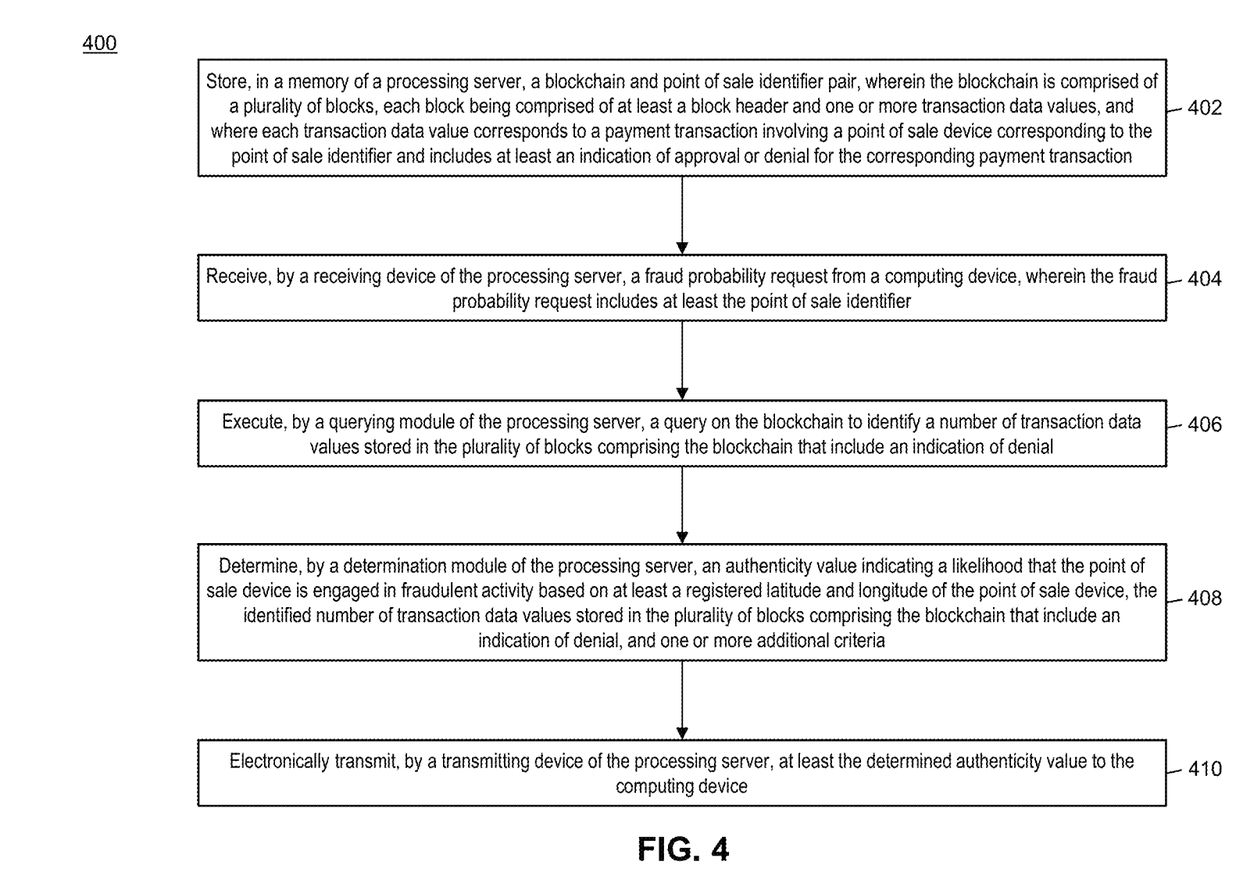
FIG. 4 is a flow chart illustrating an exemplary method for determining authenticity of a point of sale device in accordance with exemplary embodiments.

FIG. 4 illustrates a method 400 for the determination of authenticity of a point of sale device based on geographical data and transactional data as stored in a blockchain.

In step 402, a blockchain and a point of sale identifier pair may be stored in a memory (e.g., the memory 224) of the processing server (e.g., the processing server 102) wherein the blockchain is comprised of a plurality of blocks, each block being comprised of at least a block header and one or more transaction data values, and where each transaction data value corresponds to a payment transaction involving a point of sale device (e.g., the point of sale device 106) corresponding to the point of sale identifier and includes at least an indication of approval or denial for the corresponding payment transaction. In step 404, a fraud probability request may be received by a receiving device (e.g., the receiving device 202) of the processing server from a computing device (e.g., the computing device 106), wherein the fraud probability request includes at least the point of sale identifier.

In step 406, a query may be executed on the blockchain by a querying module (e.g., the querying module 216) of the processing server to identify a number of transaction data values stored in the plurality of blocks comprising the blockchain that includes an indication of denial. In step 408, an authenticity value indicating a likelihood that the point of sale device is engaged in fraudulent activity may be determined by a determination module (e.g., the determination module 218) of the processing server based on at least a registered latitude and longitude of the point of sale device, the identified number of transaction data values stored in the plurality of blocks comprising the blockchain that include an indication of denial, and one or more additional criteria. In step 410, at least the determined authenticity value may be electronically transmitted, by a transmitting device (e.g., the transmitting device 222) of the processing server, to the computing device.

In one embodiment, the fraud probability request may further include a measured latitude and longitude corresponding to a geographic location of the computing device, and the determined authenticity value may be further based on a comparison of the registered latitude and longitude of the point of sale device and the measured latitude and longitude. In some embodiments, the one or more additional criteria may be stored in the memory of the processing server. In one embodiment, the method 400 may further include receiving, by the receiving device of the processing server, the one or more additional criteria from a third party entity. In some embodiments, at least one transaction data value stored in the plurality of blocks comprising the blockchain may include the registered latitude and longitude.

In one embodiment, the one or more additional criteria may include at least one of: value of fraudulent transactions in a geographic area comprising the registered latitude and longitude, a number of fraudulent transactions in the geographic area comprising the registered latitude and longitude, and the geographic area comprising the registered latitude and longitude. In some embodiments, the registered latitude and longitude may be electronically transmitted to the computing device with the determined authenticity value.

In one embodiment, the method 400 may further include executing, by the querying module of the processing server, a query on the blockchain to identify a last transaction data value involving the point of sale device based on a transaction time included in each of the transaction data values, wherein the last transaction data value is electronically transmitted to the computing device with the determined authenticity value. In some embodiments, the method 400 may also include storing, in a point of sale database (e.g., the point of sale database 206), a point of sale profile (e.g., point of sale profile 208), wherein the point of sale profile is a structured data set related to the point of sale device including at least the point of sale identifier and the registered latitude and longitude.

Computer System Architecture

Figure 5:
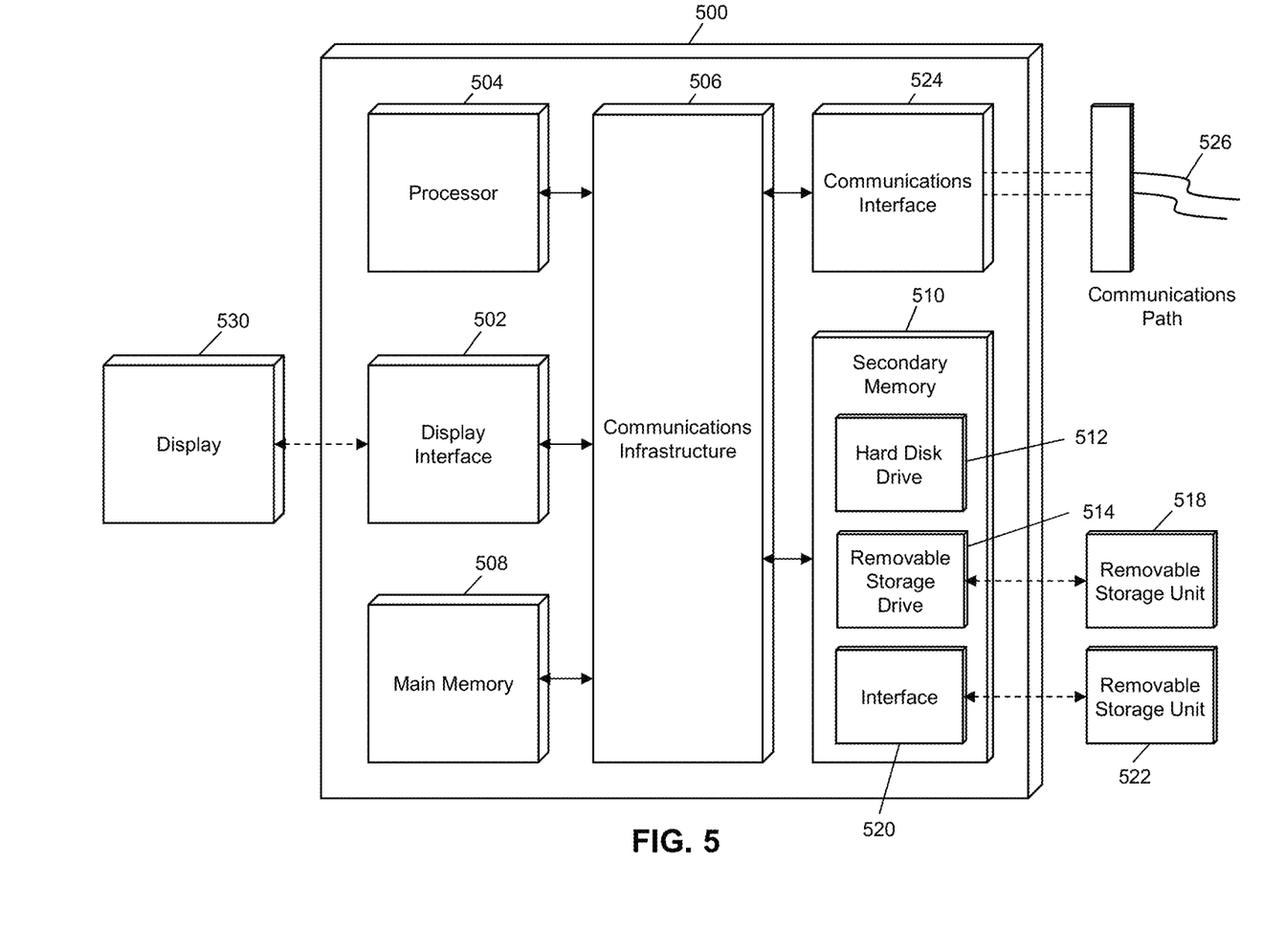
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for determining authenticity of a point of sale device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for determining authenticity of a point of sale device, comprising:
storing, in a memory of a processing server, a blockchain and point of sale identifier associated as a pair, the blockchain configured to store fraud probability requests for a point of sale device associated with the point of sale identifier and whose authenticity is being determined, and wherein the blockchain is comprised of a plurality of blocks, each block being comprised of at least a block header and one or more transaction data values, and where each transaction data value corresponds to a payment transaction involving the point of sale device transacting payment transactions for a plurality of users and corresponding to the point of sale identifier and includes at least an indication of approval or denial for the corresponding payment transaction;
receiving, by a receiving device of the processing server, a fraud probability request from a computing device of a user prior to the computing device entering into a payment transaction with the point of sale device, wherein the fraud probability request includes at least the point of sale identifier;
executing, by a querying module of the processing server, a query on the blockchain to identify a number of transaction data values stored in the plurality of blocks comprising the blockchain that include an indication of denial;
determine, by a determination module of the processing server, an authenticity value indicating a likelihood that the point of sale device is engaged in fraudulent activity based on at least a registered latitude and longitude of the point of sale device, the identified number of transaction data values stored in the plurality of blocks comprising the blockchain that include the indication of denial, and one or more additional criteria; and
electronically transmitting, by a transmitting device of the processing server, at least the determined authenticity value to the computing device.

2. The method of claim 1, wherein
the fraud probability request further includes a measured latitude and longitude corresponding to a geographic location of the computing device, and
the determined authenticity value is further based on a comparison of the registered latitude and longitude of the point of sale device and the measured latitude and longitude.

3. The method of claim 1, wherein the one or more additional criteria are stored in the memory of the processing server.

4. The method of claim 1, further comprising:
receiving, by the receiving device of the processing server, the one or more additional criteria from a third party entity.

5. The method of claim 1, wherein the one or more additional criteria includes at least one of: value of fraudulent transactions in a geographic area comprising the registered latitude and longitude, a number of fraudulent transactions in the geographic area comprising the registered latitude and longitude, and the geographic area comprising the registered latitude and longitude.

6. The method of claim 1, wherein the registered latitude and longitude are electronically transmitted to the computing device with the determined authenticity value.

7. The method of claim 1, further comprising:
executing, by the querying module of the processing server, a query on the blockchain to identify a last transaction data value involving the point of sale device based on a transaction time included in each of the transaction data values, wherein
the last transaction data value is electronically transmitted to the computing device with the determined authenticity value.

8. The method of claim 1, wherein at least one transaction data value stored in the plurality of blocks comprising the blockchain includes the registered latitude and longitude.

9. The method of claim 1, further comprising:
storing, in a point of sale database, a point of sale profile, wherein the point of sale profile is a structured data set related to the point of sale device including at least the point of sale identifier and the registered latitude and longitude.

10. The method of claim 1, wherein the one or more transaction data values comprises a plurality of payments transactions on the point of sale device, each of the plurality of payment transaction having been transacted prior to the processing server receiving the fraud probability request from the point of sale device.

11. A system for determining authenticity of a point of sale device, comprising:
a memory of a processing server configured to store a blockchain and point of sale identifier associated as a pair, the blockchain configured to store fraud probability requests for a point of sale device associated with the point of sale identifier and whose authenticity is being determined, and wherein the blockchain is comprised of a plurality of blocks, each block being comprised of at least a block header and one or more transaction data values, and where each transaction data value corresponds to a payment transaction involving the point of sale device transacting payment transactions for a plurality of users and corresponding to the point of sale identifier and includes at least an indication of approval or denial for the corresponding payment transaction;
a receiving device of the processing server configured to receive a fraud probability request from a computing device of a user prior to the computing device entering into a payment transaction with the point of sale device, wherein the fraud probability request includes at least the point of sale identifier;
a querying module of the processing server configured to execute a query on the blockchain to identify a number of transaction data values stored in the plurality of blocks comprising the blockchain that include an indication of denial;
a determination module of the processing server configured to determine an authenticity value indicating a likelihood that the point of sale device is engaged in fraudulent activity based on at least a registered latitude and longitude of the point of sale device, the identified number of transaction data values stored in the plurality of blocks comprising the blockchain that include the indication of denial, and one or more additional criteria; and
a transmitting device of the processing server configured to electronically transmit at least the determined authenticity value to the computing device.

12. The system of claim 11, wherein
the fraud probability request further includes a measured latitude and longitude corresponding to a geographic location of the computing device, and
the determined authenticity value is further based on a comparison of the registered latitude and longitude of the point of sale device and the measured latitude and longitude.

13. The system of claim 11, wherein the one or more additional criteria are stored in the memory of the processing server.

14. The system of claim 11, wherein the receiving device of the processing server is further configured to receive the one or more additional criteria from a third party entity.

15. The system of claim 11, wherein the one or more additional criteria includes at least one of: value of fraudulent transactions in a geographic area comprising the registered latitude and longitude, a number of fraudulent transactions in the geographic area comprising the registered latitude and longitude, and the geographic area comprising the registered latitude and longitude.

16. The system of claim 11, wherein the registered latitude and longitude are electronically transmitted to the computing device with the determined authenticity value.

17. The system of claim 11, wherein
the querying module of the processing server is further configured to execute a query on the blockchain to identify a last transaction data value involving the point of sale device based on a transaction time included in each of the transaction data values, and
the last transaction data value is electronically transmitted to the computing device with the determined authenticity value.

18. The system of claim 11, wherein at least one transaction data value stored in the plurality of blocks comprising the blockchain includes the registered latitude and longitude.

19. The system of claim 11, further comprising:
a point of sale database configured to store a point of sale profile, wherein the point of sale profile is a structured data set related to the point of sale device including at least the point of sale identifier and the registered latitude and longitude.

20. The system of claim 11, wherein the one or more transaction data values comprises a plurality of payments transactions on the point of sale device, each of the plurality of payment transaction having been transacted prior to the processing server receiving the fraud probability request from the point of sale device.

* * * * *